May 24, 1966

N. F. McFADDAN 3,252,204

METHOD OF MOUNTING A CONNECTOR MEMBER TO A SUPPORT MEMBER

Filed Dec. 19, 1962

INVENTOR.
Norman F. McFaddan

BY

Paul J. Ethington

ATTORNEY

United States Patent Office 3,252,204

Patented May 24, 1966

3,252,204

METHOD OF MOUNTING A CONNECTOR MEMBER TO A SUPPORT MEMBER

Norman F. McFadden, Los Angeles, Calif., assignor to General Motors Corporation, Detroit, Mich., a corporation of Delaware Filed Dec. 19, 1962, Ser. No. 245,796
7 Claims. (Cl. 29—155.5)

This invention relates to a method of mounting a connector member to a support member and more particularly to a method which effects a cold pressure weld between the connector member and the support member.

Methods for mounting connector members to support members are well known. For example, in the electrical art, electrical connectors such as terminal members are often soldered to circuit boards and then electrical leads are soldered to the terminal members. However, soldered connections may in certain environments be unreliable. A solderless connection may be effected, however, by tapering the connectors and mounting them on the ends of lead members. The connectors may then be inserted into a suitable aperture in a circuit board and will be maintained therein by friction. However, such a solderless connection does not provide a permanent mounting of the lead members and hence may also prove unreliable in certain environments.

In accordance with this invention, a method is provided for mounting a connector member to a support member without requiring a soldering operation and which provides a permanent reliable mounting of the connector member. This is accomplished by providing cold pressure weldable metal on the walls of a support member which define an aperture therein. Cold pressure weldable metal is also provided on the connector member which is formed with an end portion having a cross-sectional dimension smaller than and a body portion having a cross-sectional dimension at least equal to a cross-sectional dimension of the aperture. Thus, by inserting the end portion into the aperture and applying sufficient pressure, a cold pressure weld is effected between the cold pressure weldable metal on the connector member and the cold pressure weldable metal on the walls of the support member.

A more complete understanding of this invention may be had from the detailed description which follows taken with the accompanying drawing in which.

Figure 1:
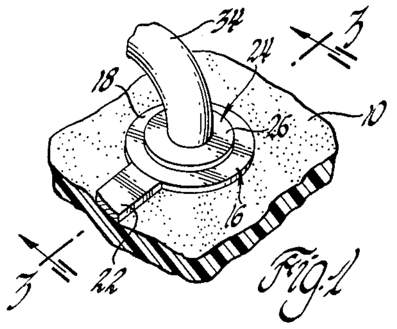
FIGURE 1 is a perspective view illustrating a connector member mounted to a support member.

Referring now to the drawing and more particularly to FIGURES 1, 2, 3 and 4, there is shown one embodiment of the invention. A circuit board 10 of suitable insulating material is provided having walls 12 defining a circular aperture 14 therein. An annular shaped copper liner member 16 having flanged end portions 18 and 20 is securely mounted within the aperture 14 with its outer surface affixed to the walls 12. The liner member 16 defines a mechanically rigid member for purposes as will be explained hereinafter. A conductor member 22 is mounted on the surface of the circuit board 10 and is connected with the liner member 16 for completing desired circuits.

A tapered sleeve member 24 of conductive material is provided having an annular flange 26 at one end. The sleeve member is embossed defining four protrusions 27 on its inner surface disposed in quadrature with respect to each other and extending in a direction parallel with the longitudinal axis of the sleeve member.

In accordance with this invention, the inner surface of the liner member 16 and the inner and outer surfaces of the sleeve member 24 are provided with a layer of cold pressure weldable metal. Cold pressure weldable metals include such ductile metals as gold, nickel, cadmium, silver, bismuth and zinc. Since gold is non-corrosive and is a good conductor, it is desired that the inner and outer surfaces of the sleeve member 24 and the inner surface of the liner member 16 be plated with gold 13. The gold plating 13 on the liner member 16 is accomplished in a manner to define a circular shaped receiving aperture 28. The sleeve member 24 is so formed that with its gold plating 13 thereon its outer diameter at one end 30 is less than the diameter of the receiving aperture 28 and that its remaining length is equal to or greater than the diameter of the receiving aperture 28.

During assembly, the circuit board 10 is mounted on a suitable anvil 32. An electrical lead member 34 of cold weldable metal, such as nickel, has one end thereof inserted into the sleeve member 24. The sleeve member is then aligned coaxially with the aperture 12 and its end 30 is inserted into the receiving aperture 28. A suitable gripping tool 36 adapted to grip the lead member 34 is provided for applying pressure to the sleeve member 24 in a direction as indicated by the arrow in FIGURE 2 parallel to its longitudinal axis so as to urge the sleeve member into the receiving aperture 28. The mechanically rigid liner member 16 will resist radial expansion providing a backing for the gold plating thereon. The interference fit of the outer surface of the sleeve member 24 and the inner surface of the liner member 16 will result in a plastic cold flow of the gold plating 13 respectively thereon to effect merging thereof into a solid phase welding bond. Simultaneously, the sleeve member 24 is deformed radially inward whereby the protrusions 27 tend to dig into the lead member 34. This will also result in a plastic cold flow of gold plating 13 on the inner surface of the liner member 16 with the nickel wire 34 to effect a merger thereof into a solid phase welding bond.

Figure 2:
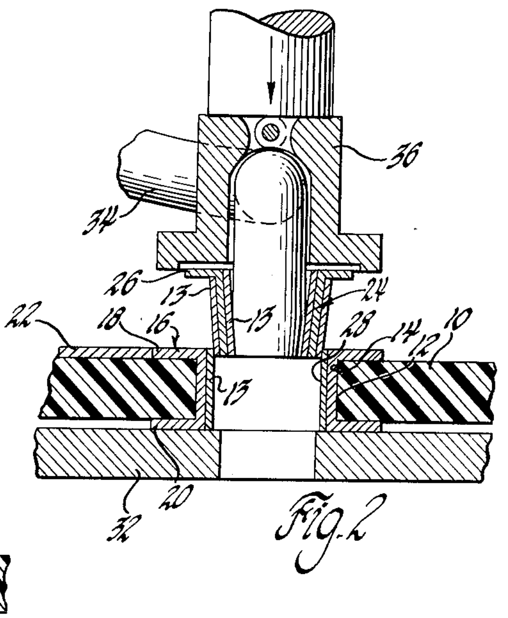
FIGURE 2 is a sectional view illustrating a method of assembling the article shown in FIGURE 1 in accordance with one embodiment of the invention.
Figure 3:
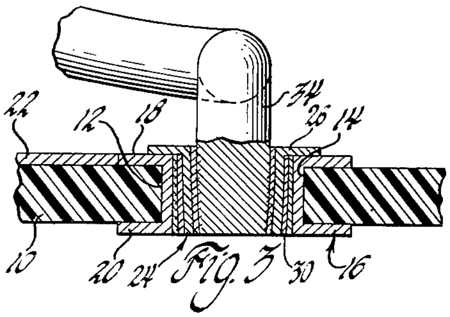
FIGURE 3 is a sectional view of the assembly taken along lines 3—3 in FIGURE 1 and looking in the direction of the arrows.
Figure 4:
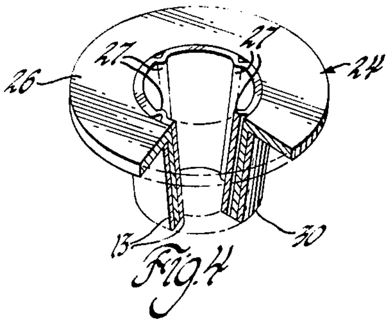
FIGURE 4 is a perspective view partly in section illustrating a sleeve member used in assembling the article illustrated in FIGURE 1.
Figure 6:
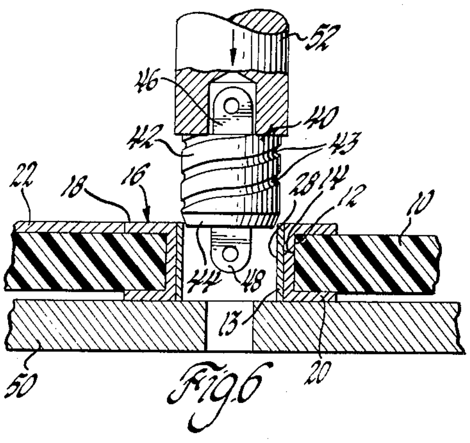
FIGURE 6 is a sectional view illustrating a method of assembling the article shown in FIGURE 5 in accordance with a second embodiment of the invention.
Figure 5:
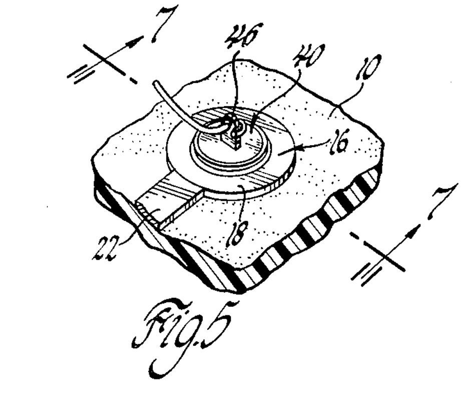
FIGURE 5 is a perspective view of a connector member mounted to a support member.
Figure 7:
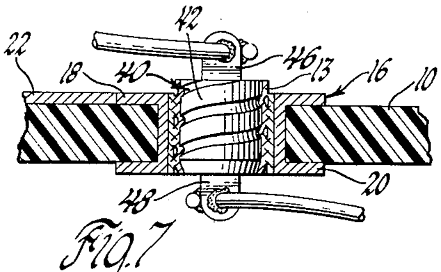
FIGURE 7 is a sectional view of the assembly taken along lines 7—7 in FIGURE 5 looking in the direction of the arrows.

Referring now to FIGURES 5, 6 and 7, there is shown a second embodiment of the invention utilizing a circuit board 10 including a gold plated liner member 16 affixed thereto in a manner identical to that shown in FIGURES 1, 2 and 3. However, instead of utilizing a sleeve member 24, the connector member takes the form of a solid nickel stud 40 having a cylindrical body portion 42 chamfered at one end 44. Terminal lugs 46 and 48 are formed at opposite ends of the stud 40 to which suitable electrical leads may be welded. A plurality of spiral grooves 43 are provided in the cylindrical surface of the body portion 42 of the stud 40 for facilitating mounting of the stud 40 to the circuit board 10. The cylindrical surface of the stud 40 is plated with gold 13 to provide a cold pressure weldable surface. The stud 40 is so formed that with its gold plating 13 thereon the diameter of its chamfered end 44 is smaller than and the diameter of its body portion 42 is equal to or greater than the diameter of the receiving aperture 28.

During assembly, the circuit board 10 is placed on a suitable anvil 50. The stud 40 is then coaxially aligned with the aperture 28 and its chamfered end 44 is inserted into the receiving aperture 28. A suitable tool 52 is provided for applying pressure to the stud 40 in a direction as indicated by the arrow in FIGURE 6 parallel to its longitudinal axis so as to urge the stud 40 into the receiving aperture 28. The liner member 16 will resist axial expansion providing a backing for the gold plating thereon. The walls of the stud 40 which define the grooves 43 will tend to dig into the gold plating 13 on the liner member 16. The interference fit of the stud 40 and the inner surface of the liner member 16 will result in a plastic cold flow of the gold plating 13 respectively thereon to effect a merging thereof into a solid phase welding bond. As shown in FIGURE 7, the assembly permits welding of suitable electrical leads to the terminal lugs 46 and 48.

Although the description of this invention has been given with respect to two particular embodiments, it is not to be construed in a limiting sense. Numerous variations and modifications within the spirit and scope of the invention will now occur to those skilled in the art. For a definition of the invention, reference is made to the appended claims.

I claim:

1. A method of mounting an electrical connector member to a circuit board having walls defining an aperture therein and comprising the steps of mounting a mechanically rigid liner member on the walls of the circuit board, applying cold pressure weldable metal on the liner member to define a receiving aperture, applying cold pressure weldable metal on the connector member, forming the connector member with an end portion having a cross-sectional dimension smaller than and a body portion having a cross-sectional dimension at least equal to a cross-sectional dimension of the receiving aperture, inserting the end portion of the connector member into the receiving aperture, and cold pressure welding the cold pressure weldable metal on the connector member with the cold pressure weldable metal on the liner member by applying pressure to the connector member to urge the connector member into the receiving aperture.

2. A method of mounting a circular shaped electrical connector member to a circuit board having walls defining an aperture therein and comprising the steps of mounting a mechanically rigid liner member within the aperture with the outer surface of the liner member affixed to the walls of the circuit board, applying cold pressure weldable metal on the inner surface of the liner member to define a circular shaped receiving aperture, applying cold pressure weldable metal on the connector member, forming the connector member with an end portion of smaller diameter than and a body portion of at least the same diameter as the receiving aperture, inserting the end portion of the connector member into the receiving aperture, and cold pressure welding the cold pressure weldable metal on the connector member with the cold pressure weldable metal on the liner member by applying pressure to the connector member to urge the connector member into the receiving aperture.

3. A method of mounting a solid electrical connector member to a circuit board having walls defining an aperture therein and comprising the steps of mounting a mechanically rigid liner member of conductive material within the aperture with the liner member connected to an electrical conductor on the circuit board for completing desired circuits and with the outer surface of the liner member affixed to the walls of the circuit board, applying cold pressure weldable metal on the inner surface of the liner member to define a receiving aperture, forming electrical terminal means at one end of the connector member adapted to mount electrical leads, applying cold pressure weldable metal on the connector member, forming the connector member with a chamfered end portion having a cross-sectional dimension smaller than and a body portion having a cross-sectional dimension equal to or greater than a cross-sectional dimension of the receiving aperture, inserting the chamfered end portion of the connector member into the receiving aperture, and cold pressure welding the cold pressure weldable metal on the connector member with the cold pressure weldable metal on the liner member by applying pressure to the connector member to urge the connector member into the receiving aperture.

4. A method of mounting a solid cylindrical electrical connector member to a circuit board having walls defining a circular shaped aperture therein and comprising the steps of mounting a mechanically rigid annular shaped liner member of conductive material within the aperture with the liner member connected to an electrical conductor on the circuit board for completing desired circuits and with the outer surface of the liner member affixed to the walls of the circuit board, plating the inner surface of the liner member with gold to define a circular shaped receiving aperture, forming electrical terminal means at opposite ends of the connector member, forming grooves in the cylindrical surface of the connector member, plating the cylindrical surface of the connector member with gold, forming the connector member with a chamfered end portion of smaller diameter than and a body portion of at least the same diameter as the diameter of the receiving aperture, aligning the connector member coaxially with the receiving aperture, inserting the chamfered end portion of the connector member into the receiving aperture, and cold pressure welding the gold plating on the connector member with the gold plating on the liner member by applying pressure to the connector member in a direction parallel to its longitudinal axis to urge the connector member into the receiving aperture.

5. A method of mounting an electrical lead member to a circuit board having walls defining an aperture therein and comprising the steps of mounting a mechanically rigid liner member of conductive material within the aperture with the liner member connected to an electrical conductor on the circuit board for completing desired circuits and with the outer surface of the liner member affixed to the walls of the circuit board, applying cold pressure weldable metal on the inner surface of the liner member to define a receiving aperture, applying cold pressure weldable metal on the outer surface of a sleeve member of conductive material, mounting a portion of the lead member within the sleeve member, forming the sleeve member with an end portion having a cross-sectional dimension smaller than and a body portion having a cross-sectional dimension at least equal to a cross-sectional dimension of the receiving aperture, inserting the end portion of the sleeve member into the receiving aperture, and cold pressure welding the cold pressure weldable metal on the outer surface of the sleeve member with the cold pressure weldable metal on the liner member by applying pressure to the sleeve member to urge the sleeve member into the receiving aperture.

6. A method of mounting a cold pressure weldable metal electrical lead member to a circuit board having walls defining an aperture therein and comprising the steps of mounting a mechanically rigid liner member of conductive material within the aperture with the liner member connected to an electrical conductor on the circuit board for completing desired circuits and with the outer surface of the liner member affixed to the walls of the circuit board, applying cold pressure weldable metal on the inner surface of the liner member to define a circular shaped receiving aperture, applying cold pressure weldable metal on the inner and outer surfaces of a conductive sleeve member of circular cross-section, mounting a portion of the lead member within the sleeve member, forming the sleeve member with an end portion having a smaller diameter than and a body portion of equal or greater diameter as the diameter of the receiving aperture, inserting the end portion of the sleeve member into the receiving aperture, and cold pressure welding the cold pressure weldable metal on the outer and inner surfaces of the sleeve member with the cold pressure weldable metal on the liner member and with the lead member, respectively, by applying pressure to the sleeve member to urge the sleeve member into the receiving aperture.

7. A method of mounting a cold pressure weldable metal electrical lead member to a circuit board having walls defining a circular shaped aperture therein and comprising the steps of mounting a mechanically rigid annular shaped liner member of conductive material within the aperture with the liner member connected to an electrical conductor on the circuit board for completing desired circuits and with the outer surface of the liner member affixed to the walls of the circuit board, plating the inner surface of the liner member with gold to define a circular shaped receiving aperture, forming protrusions on the inner surface of a tapered sleeve member of conductive material, plating the inner and outer surfaces of the sleeve member with gold, mounting one end of the lead member within the sleeve member, forming the sleeve member with one end of smaller diameter than and a portion of its remaining length of equal or greater diameter as the diameter of the receiving aperture, aligning the sleeve member coaxially with the receiving aperture, inserting the smaller diameter end of the sleeve member into the receiving aperture, and cold pressure welding the gold plating on the inner and outer surfaces of the sleeve member with the lead member and the gold plating on the liner member, respectively, by applying pressure to the sleeve member in a direction parallel to its longitudinal axis to urge the connector member into the receiving aperture.

References Cited by the Examiner

UNITED STATES PATENTS

| | | | |
|---|---|---|---|
| 1,661,448 | 3/1928 | Taylor. | |
| 2,671,746 | 3/1954 | Brew. | |
| 2,739,369 | 3/1956 | Cooney | 29—470.1 XR |
| 2,839,640 | 6/1958 | Epstein. | 29—470.1 XR |
| 3,076,164 | 1/1963 | Ullman et al. | 339—275 XR |

JOHN F. CAMPBELL, *Primary Examiner*.

C. I. SHERMAN, *Assistant Examiner*.